No. 689,878. Patented Dec. 31, 1901.
W. C. HARTMANN.
CENTRIFUGAL CREAM SEPARATOR.
(Application filed Oct. 5, 1900.)
(No Model.)

WITNESSES
INVENTOR
Wm. C. Hartmann
BY B. F. Eibler Atty.

UNITED STATES PATENT OFFICE.

WILLIAM C. HARTMANN, OF CLEVELAND, OHIO, ASSIGNOR, BY DIRECT AND MESNE ASSIGNMENTS, TO HENRY J. NEIPFOOT AND STANDARD SEPARATOR CO., LTD., OF ELYRIA, OHIO.

CENTRIFUGAL CREAM-SEPARATOR.

SPECIFICATION forming part of Letters Patent No. 689,878, dated December 31, 1901.

Application filed October 5, 1900. Serial No. 32,080. (No model.)

*To all whom it may concern:*

Be it known that I, WILLIAM C. HARTMANN, a citizen of the United States of America, and a resident of Cleveland, in the county of Cuyahoga and State of Ohio, have invented certain new and useful Improvements in Centrifugal Cream-Separators, of which the following is a specification.

My invention relates to machines or apparatuses wherein cream is separated from milk by centrifugal force; and the object of my invention is to perfect such contrivances, so as to render the separation of the constituent parts of milk or other substances absolute and complete; and another object is to construct such machines in a simple and compact manner, which admits of convenient and thorough cleaning of such apparatuses. I attain these objects in a machine constructed and arranged substantially as shown in the accompanying drawings, in which—

Figure 1:
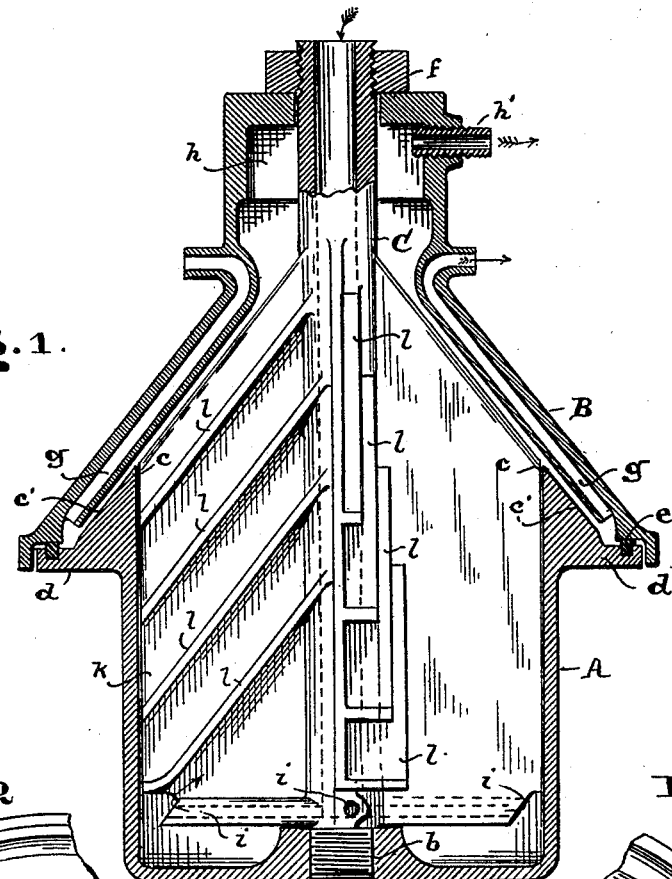
Figure 2:
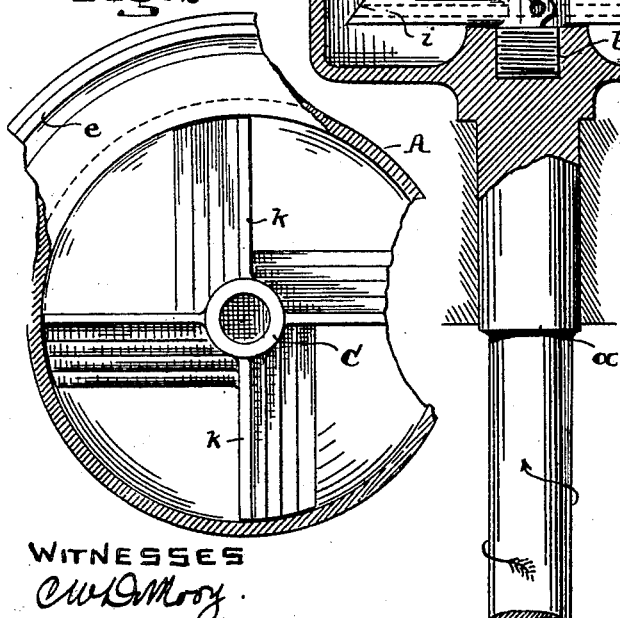
Figure 3:
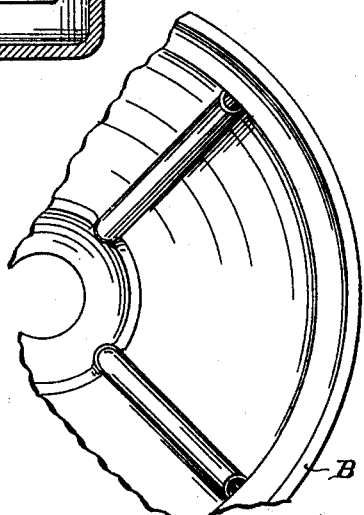

Figure 1 represents a central vertical sectional view of said machine; Fig. 2, a partial plan view of the lower part of said machine, and Fig. 3 is a partial inverted plan view of the upper part of said machine or cream-separator.

Like letters of reference denote like parts in the drawings and specification.

Substantially the machine consists of a revoluble casing A, a cover B for same, and a movable supply-tube C. (See Figs. 1 and 2.) Cylindrical form is preferred for the casing A proper. The shaft part $a$ thereof is guided in a suitable bearing, and below the bearing the shaft is driven by or from any suitable source of power. In such manner or similarly may the rotation of this machine be effected. Inside the casing is a screw-threaded socket $b$, enabling secure connection of the feed-tube C, above referred to. Part way down from the upper terminal $c$ is formed a flange $d$ around the casing A. The conical cover B extends over the terminal $c$ and forms a packed joint with flange $d$ by means of ring $e$ upon being tightened by means of nut $f$, which nut has a screw-threaded connection with tube C. From the lower portion of said cover to the upper outer portion thereof are leading a series of ports $g$, which afford exit of the skim-milk from said separator, while in the dome $h$ there is a pipe $h'$ for drainage of the cream. The milk enters the separator by way of the lateral ports $i$, which branch from out the tube C, near the bottom thereof. Formed in alinement with said ports and preferably integral with the tubular column C are the wings $k$. Said wings extend in radial direction in close proximity to the periphery of the casing, so as to form a series of compartments which more or less divide the contents of the casing, and thereby facilitate the separation of the cream from the skim-milk. Upon each of the wings there are provided a series of slanting plates $l$, which gradually diminish in width from the bottom up. (See Fig. 1.) Said plates are also provided to enhance the separation of the specifically lighter mass (cream) from the heavier liquid, (skim-milk.)

The milk upon entering the revoluble vessel A by way of ports $i$ is first thrown toward the wall of the vessel, owing to the centrifugal force developed by the rotation of said vessel. Gradually the cream is separated therefrom and forced to a more central portion of the vessel, from where it finds exit by way of pipe $h'$. The skim-milk rises up in the outer portion of the vessel and passes over the terminal $c$, thence downward, and finally up and outward by way of the ports $g$. Outside the cover the cream as well as the skim-milk are collected in suitable pans. (Not shown.) In directing the flow of the skim-milk over the dam adjacent the terminal $c$ the separation of the cream therefrom is made complete, since both centrifugal force as well as force of gravity render it impossible for the cream to reach the inlet of the ports $g$. This result is due to the construction of the bowl with the auxiliary chamber or overflow. As is well known, in this class of machines the centrifugal action superinduced by the rapid rotation of the bowl and the use of "quartering-blades" or their equivalent throws the material away from the axis of rotation with a momentum commensurate with the specific gravity of the parts forming the material. In other words, the heavier particles move or are thrown outward with greater rapidity, while the lighter particles move slower, and hence as there is a constant feed of the material to the bowl these particles are held in substantial concentric lines, according to the specific gravity, the heaviest particles being contiguous to the outer walls of the bowl. These relative positions are retained while the body of liquid is rising, (due to the feeding at the lower end,) so that the cream and skim-milk are substantially separated when the material has reached the plane of the terminal $c$, although some of the lighter particles might still remain within the skim-milk. To separate more completely, the auxiliary chamber or overflow is provided. As before explained, the material rises constantly within the bowl, subject during this movement to the centrifugal action exerted in substantial horizontal planes. When, therefore, the material rises to a point above the plane of the terminal $c$, the resistance to the outward movement of the material (due to the vertical wall) is terminated, so that the material close to the wall may receive the full centrifugal action in increased ratio, owing to the radial extension provided. At this point, however, the material comes in contact with the beveled or inclined walls of the auxiliary chamber, and as the inclination is in the direction of still greater centrifugal action there is a tendency to move the heavier skim-milk to the point of greatest centrifugal action, (the bottom of the auxiliary chamber,) and it is removed from the chamber at this point. It will be clear, therefore, that while the bowl may be filled with milk and cream that portion of the material close to the vertical wall (the heavier part) is subjected to increased centrifugal action, followed by a movement downwardly and outwardly, which takes it entirely away from the bowl proper, increasing the pressure toward the skim-milk-outlet openings, and at the same time there will be a tendency of the lighter particles to be separated during the outward movement, and these tend to pass upwardly toward the cream-outlet. A simple radial movement of the material in a fixed horizontal plane would not accomplish this result, as in such case the particles pass directly to the outlet-opening, giving no opportunity for the separation. By forcing the skim-milk downwardly in a direction opposite to that which it had been moving prior to reaching the terminal $c$, and thus forming a radical change in the movement, opportunity is given for the further separation at the point on the wall B opposite the terminal $c$, while still permitting the increased centrifugal action and pressure toward the skim-milk-outlet opening.

The induction-tube C, with its ports, wings, and plates, is made movable simply to enable a convenient and thorough cleansing of the apparatus for the purpose of maintaining the interior in sweet pure condition, which is a matter of utmost importance in treating milk and the products obtained therefrom.

What I claim, and desire to secure by Letters Patent, is—

1. A centrifugal cream-separator having a separating-chamber and an independent auxiliary chamber located without and concentric with said separating-chamber, said chambers communicating with each other solely at the upper portion of said auxiliary chamber; a feed-tube extending to the lower end of the separating-chamber; and a skim-milk-outlet opening at the lower end of said auxiliary chamber, whereby the milk is compelled to pass first downward, then upward, the cream continuing such upward movement, the skim-milk being again passed downward and outward and followed by an upward movement to the point of exit.

2. A centrifugal cream-separator having a separating-chamber and a peripheral auxiliary chamber, said chambers having an annular communication with each other solely at the upper portion of said auxiliary chamber and intermediate the top and bottom of said separating-chamber; a feed-tube extending to the lower end of the separating-chamber; and a skim-milk-outlet opening at the lower end of said auxiliary chamber, whereby the milk is compelled to pass first downward, then upward, the cream continuing such upward movement, the skim-milk being again passed downward and outward and followed by an upward movement to the point of exit.

3. A centrifugal cream-separator having a separating-chamber, the walls of its lower portion extending vertically, the remaining portion being flared; an auxiliary peripheral chamber formed within the walls and concentrically with said separating-chamber, said auxiliary and separating chambers communicating with each other at the point of meeting of said vertical and flared portions of the walls; a feed-tube at the lower end of the separating-chamber; and a skim-milk outlet at the lower end of said auxiliary chamber, whereby the milk is compelled to pass first downward, then upward, the cream continuing such upward movement, the skim-milk being again passed downward and outward and followed by an upward movement to the point of exit.

4. A centrifugal cream-separator having a separating-chamber, the walls of its lower portion extending vertically, the remaining portion being flared; an auxiliary peripheral chamber formed within the walls and concentrically with said separating-chamber, said auxiliary and separating chambers communicating with each other at the point of meeting of said vertical and flared portions of the walls; the auxiliary chamber being on a lower plane than the point of communication; a feed-tube at the lower end of said separating-chamber; and a skim-milk outlet or outlets at the lower end of said auxiliary chamber, whereby the milk is compelled to pass first downward, then upward, the cream continuing such upward movement, the skim-milk being again passed downward and outward and followed by an upward movement to the point of exit.

5. In a bottom-feed centrifugal cream-separator, a peripheral auxiliary chamber communicating with the separating-chamber intermediate the ends thereof, said peripheral chamber having parallel walls extending downwardly and outwardly, substantially as described.

6. In a centrifugal cream-separator, a separating-bowl, the walls of the lower portion extending vertically, the remaining portion being flared; a milk-feed tube extending vertically through said bowl and having its inlet therein at the bottom thereof; a peripheral recess, leading downward and outward from the point of junction of the vertical and flared portions of the bowl, said recess having its walls parallel, the outer wall forming a continuation of the flared portion of the bowl; said recess communicating with the interior of the bowl; and a skim-milk outlet at the lower end of said recess or chamber.

Signed at Cleveland, Ohio, this 22d day of September, 1900.

WILLIAM C. HARTMANN.

Witnesses:
BERNH. F. EIBLER,
J. A. LISTER.